United States Patent
Kondo et al.

(10) Patent No.: US 6,418,233 B1
(45) Date of Patent: Jul. 9, 2002

(54) MOTION DETERMINING APPARATUS AND DETERMINING METHOD

(75) Inventors: Tetsujiro Kondo; Masashi Uchida; Nobuyuki Asakura, all of Tokyo; Takuo Morimura; Kazutaka Ando, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 09/583,255

(22) Filed: May 31, 2000

Related U.S. Application Data (63) Continuation of application No. PCT/JP99/05449, filed on Oct. 4, 1999.

(30) Foreign Application Priority Data

Oct. 2, 1998 (JP) ........................................... 10-281085

(51) Int. Cl.[7] .................................................. G06K 9/00
(52) U.S. Cl. ..................... 382/107; 348/413.1; 382/236
(58) Field of Search ................................. 382/100, 107, 382/239, 236; 352/60; 250/559.49, 206.1; 358/261.1; 348/412.1, 413.1

(56) References Cited

U.S. PATENT DOCUMENTS

| | | | | |
|---|---|---|---|---|
| 3,707,147 A | * | 12/1972 | Sellers | ........................ 600/525 |
| 3,963,332 A | * | 6/1976 | Sheldon et al. | ................ 352/60 |
| 4,570,074 A | * | 2/1986 | Jette | ....................... 250/559.49 |
| 4,666,273 A | * | 5/1987 | Shimizu et al. | .............. 353/101 |
| 5,027,201 A | * | 6/1991 | Bernard | ........................ 358/105 |
| 5,943,099 A | * | 8/1999 | Kim | ........................... 348/448 |
| 6,066,954 A | * | 5/2000 | Gershenfeld et al. | ........ 324/671 |
| 6,239,842 B1 | * | 5/2001 | Segman | ....................... 348/448 |

FOREIGN PATENT DOCUMENTS

| | | |
|---|---|---|
| JP | 60-194684 | 10/1985 |
| JP | 3-283783 | 12/1991 |
| JP | 3-291080 | 12/1991 |
| JP | 4-35485 | 2/1992 |
| JP | 9-214901 | 8/1997 |

* cited by examiner

*Primary Examiner*—Jayanti K. Patel
(74) *Attorney, Agent, or Firm*—Frommer Lawrence & Haug LLP; William S. Frommer (57) ABSTRACT

A first condition determining portion 6 determines whether or not a picture moves corresponding to inter-field variations of space variation amounts SG (t), SG (t−1), and SG (t+1). A second condition determining portion 7 determines whether a picture moves corresponding to inter-field differences FiGu (t−1), FiGu (t), FiGd (t−1), and FiGd (t). A third condition determining portion 8 determines whether or not a picture moves corresponding to a ratio gf of the inter-frame difference FrG to the space variation amount SG (t). When one of the first to third conditions is satisfied, an OR gate 9 outputs data "1" that represents that a picture moves.

20 Claims, 5 Drawing Sheets

MOTION DETERMINING APPARATUS AND DETERMINING METHOD

This is a continuation of copending International Application PCT/JP99/05449 having an international filing date of Oct. 4, 1999.

TECHNICAL FIELD

The present invention relates to a motion determining apparatus and a motion determining method for accurately determining the motion of a picture that is interlace-scanned.

RELATED ART

When an interlace-scanned picture (hereinafter referred to as interlace picture) is converted into a non-interlace-scanned picture that is a progressively scanned picture (hereinafter this picture is referred to as progressive picture), coefficients such as tap coefficients of a filter used for the process are varied depending on whether or not the interlace picture moves so as to properly process the interlace picture. There are several types of converting processes such as a process for converting an interlace picture of one standard into an interlace picture of another standard; a process for converting a standard resolution interlace picture into a high resolution picture; and a process for controlling tap coefficients of a digital filter for detecting the motion of an interlace picture. In these converting processes, as a pre-process, it may be determined whether or not an interlace picture to be processed moves.

However, in a conventional motion determining apparatus, when only part of a considered field of an interlace picture is largely different from adjacent fields (for example, an interlace picture to be processed shows a jet plane that flies fast and disappears from the screen), although the part moves, it may be improperly determined that the part stops.

In this case, a process suitable for a picture that stops (for example, an inter-frame process for interpolating data of the current frame with data at the same position of the preceding frame) is performed for a picture that moves. The processed result is not a picture that smoothly moves. In addition, the process may fail in the middle.

On the other hand, although a picture that stops, when it is determined that the picture moves, a process suitable for a picture that moves (for example, an intra-field process) is performed. Thus, the picture that stops blurs.

Thus, the determined result of whether or not a picture moves largely affects a picture that is processed. Consequently, the motion determining process should be accurately performed (without error).

In addition to the process for an interlace picture, the motion determining process should be correctly performed for a progressive picture. A recursive noise reducing apparatus using the phenomenon of which a picture signal correlates on time axis but noise does not is known. With such a noise reducing apparatus, noise of a progressive picture can be reduced. The noise reducing apparatus determines whether or not a particular picture moves. When the motion of the picture is detected, the recursive process should be stopped. In addition, the contents of the frame memory should be rewritten. Thus, even in the noise reducing apparatus, unless the motion can be correctly determined, the above-described problem will take place.

Therefore, the present invention is made from the above-described point of view. An object of the present invention is to more accurately determine the motion of a picture than before.

DISCLOSURE OF THE INVENTION

The present invention is to solve the above-described problem. The invention of claim 1 is a motion determining apparatus for determining a motion of an object contained in an input picture signal, comprising a space variation detecting means for detecting a space variation of the input picture signal, a time variation detecting means for detecting a time variation of the input picture signal, a ratio detecting means for detecting the ratio of the space variation to the time variation, and a motion determining means for determining the motion of the object contained in the input picture signal according to the space variation, the time variation, and the ratio.

Preferably, the space variation detecting means detects a space variation of the input picture signal of the considered field corresponding to an input picture signal of a considered field and input picture signals of at least the fields that precede and follow the considered field. In the progressive system, a field is equivalent to a frame.

The invention of claim 11 is a motion determining method for determining the motion of an object contained in an input picture signal, comprising the steps of detecting a space variation of the input picture signal, detecting a time variation of the input picture signal, detecting the ratio of the space variation to the time variation, and determining the motion of the object contained in the input picture signal according to the space variation, the time variation, and the ratio.

BEST MODES FOR CARRYING OUT THE INVENTION

Figure 1:
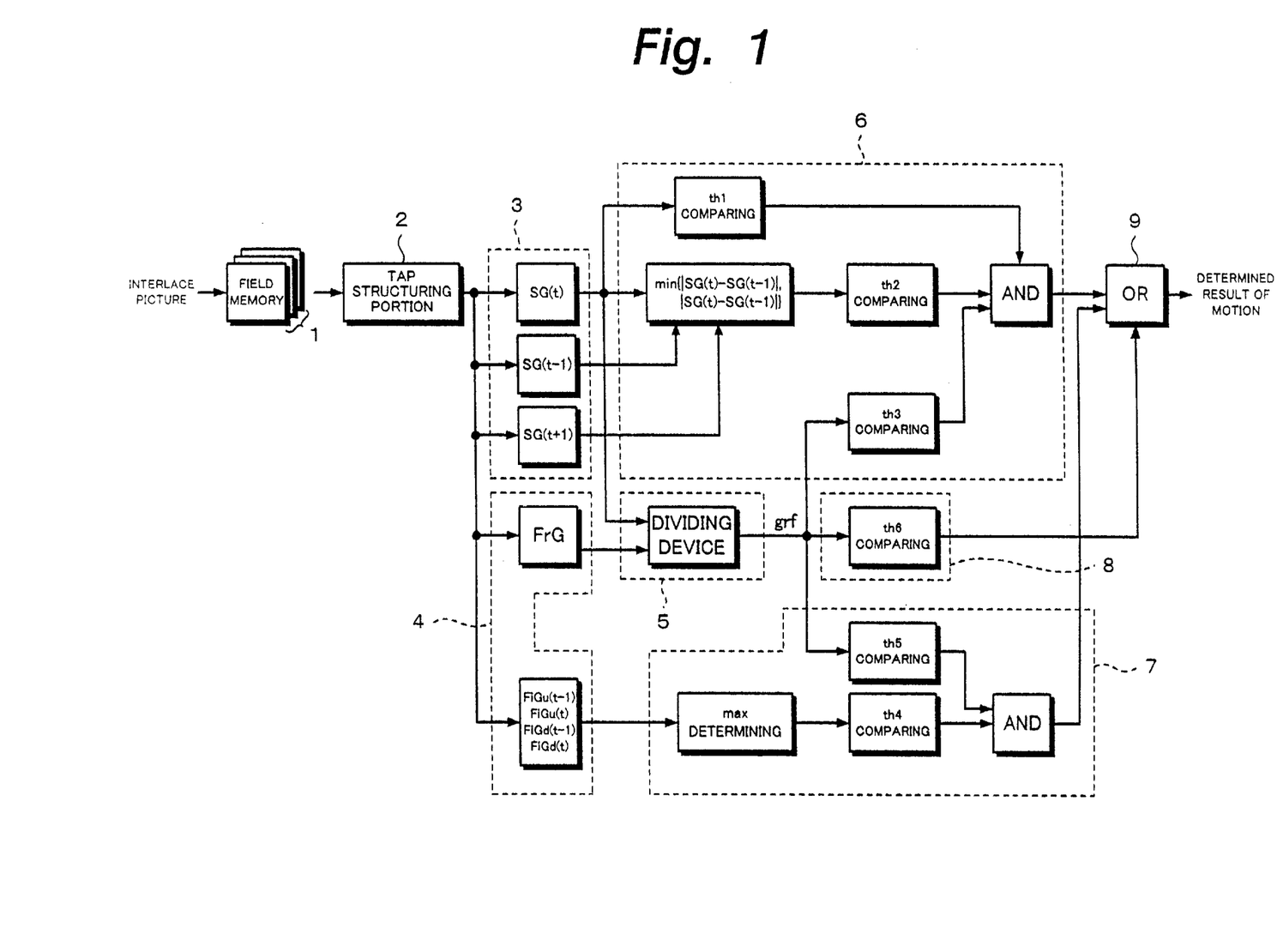
FIG. 1 is a block diagram showing an example of the structure of a motion determining apparatus according to an embodiment of the present invention.

FIG. 1 is a block diagram showing an example of the structure of a motion determining apparatus according to an embodiment of the present invention. The motion determining apparatus according to the embodiment of the present invention determines whether or not a particular interlace picture moves.

In other words, each field that composes an interlace picture is supplied in a time sequence to a field memory 1. The field memory 1 successively stores pictures of individual fields. The field memory 1 has a storage capacity for at least pictures of three fields.

The field memory 1 is connected to a tap structuring portion 2. The tap structuring portion 2 reads predetermined pixels (pixel values) from the field memory 1 and structures taps to be processed. In other words, when a field at time t (this field is referred to as t-th field) is considered, a particular pixel of the t-th field is considered. The particular pixel is referred to as considered pixel. In this case, the considered pixel may be a real pixel that composes the picture of the t-th field.

It should be noted that the present invention can be applied to the case that a progressive signal of which frames are successively arranged is processed.

Figure 2:
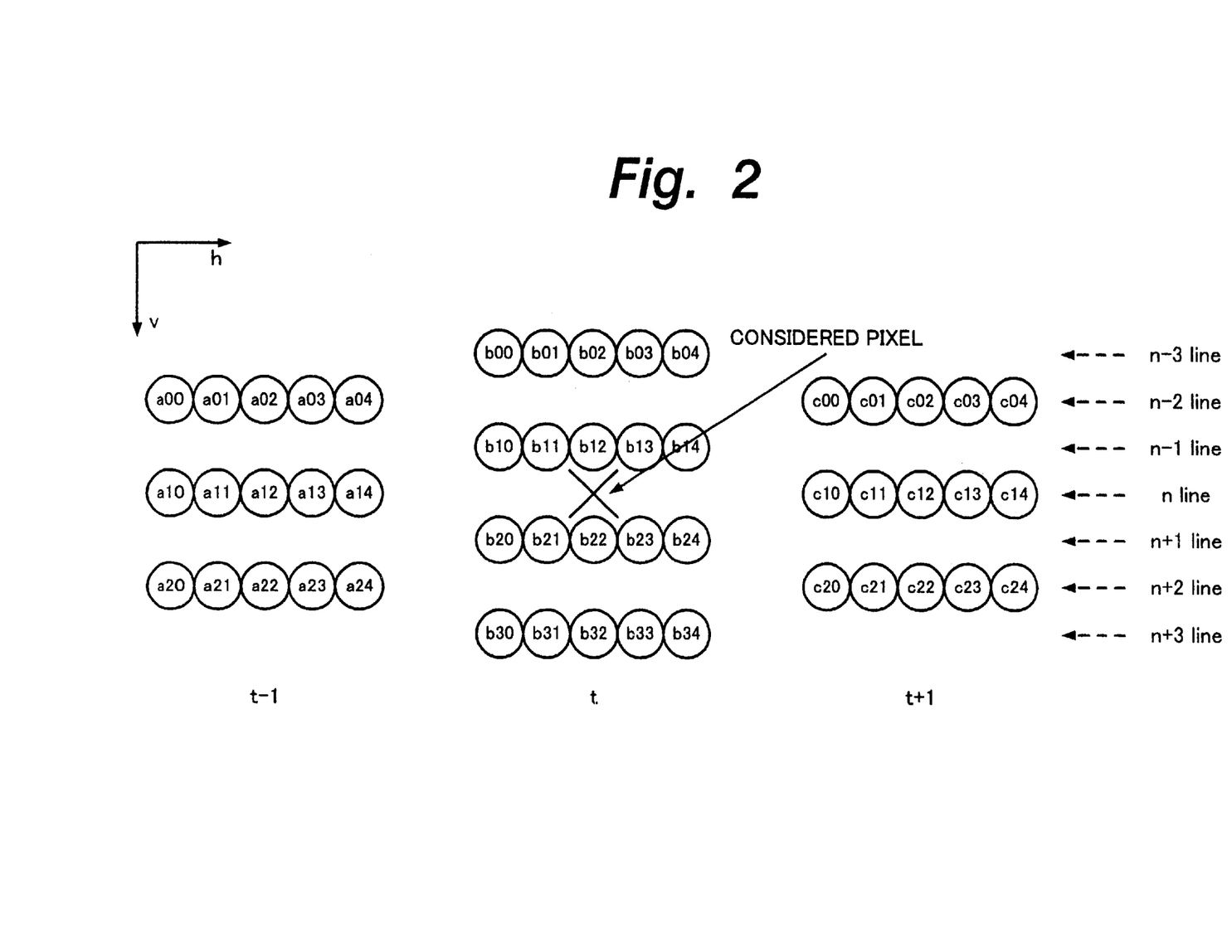
FIG. 2 is a schematic diagram for explaining a process of a tap structuring portion.

The tap structuring circuit 2 selects 50 pixels shown in FIG. 2 as taps used for determining the motion of a picture. The tap structuring circuit 2 outputs the selected taps. FIG. 2 shows partial pictures at the spatially the same positions of successive three fields at time t−1, t, and t+1. In FIG. 2, dots represent pixels sampled at a predetermined frequency. For example, one pixel is a luminance value composed of eight bits.

In the field at time t−1, five taps are selected from each of chronologically successive three lines in such a manner that the positions of the five taps accord on each line. Likewise, in the field at time t+1, five taps are selected from each of chronologically successive three lines. Thus, the spatial positions of the taps of these fields are the same. In contrast, in the present field (at time t), five taps are selected from each of chronologically successive four lines in such a manner that the positions of the five taps accord on each line. Due to the interlace picture, the taps of the four lines of the current field at time t spatially deviate by one line from those of the fields at time t−1 and time t+1. In FIG. 2, x represents a considered pixel. With respect to the considered pixel, the motion of the picture is determined.

The tap structuring portion 2 is connected to a space variation calculating portion 3 and a time variation calculating portion 4. The space variation calculating portion 3 calculates space variation amounts SG (t), SG (t−1), and SG (t+1) of the taps of the (t−1)-th field, the t-th field, and the (t+1)-th field. The space variation amounts are supplied to a time variation to space variation calculating portion 5 and a first condition determining portion 6.

The space variation amount of each field is obtained by calculating the absolute value of the difference between each pixel and each of the adjacent pixels thereof and summing the obtained absolute values. When the values of the pixels as the taps are defined as shown in FIG. 2, the space variation amounts SG (t), SG (t−1), and SG (t+1) are calculated as follows.

$SG(t) = [|b00-b01|+|b01-b02|+|b02-b03|$ $+|b03-b04|+|b10-b11|+|b11-b12|$ $+|b12-b13|+|b13-b14|+|b20-b21|$ $+|b21-b22|+|b22-b23|+|b23-b24|$ $+|b30-b31|+|b31-b32|+|b32-b33|$ $+|b33-b34|+|b00-b10|+|b01-b11|$ $+|b21-b02|+|b12-b03|+|b13-b14|$ $+|b10-b20|+|b11-b21|+|b12-b22|$ $+|b13-b23|+|b14-b24|+|b20-b30|$ $+|b21-b31|+|b22-b32|+|b23-b33|$ $+|b24-b34|]/31$ $SG(t-1) = [|a00-a01|+|a01-a02|+|a02-a03|$ $+|a10-a11|+|a11-a12|+|a12-a13|$ $+|a20-a21|+|a21-a22|+|a22-a23|$ $+|a00-a10|+|a01-a11|+|a02-a12|$ $+|a03-a13|$ $+|a10-a20|+|a11-a21|+|a12-a22|$ $+|a13-a23|]/17$ $SG(t+1) = [|c00-c01|+|c01-c02|+|c02-c03|$ $+|c10-c11|+|c11-c12|+|c12-c13|$ $+|c20-c21|+|c21-c22|+|c22-c23|$ $+|c00-c10|+|c01-c11|+|c02-c12|$ $+|c03-c13|$ $+|c10-c20|+|c11-a21|+|c12-a22|$ $+|c13-c23|]/17$

The time variation calculating portion 4 calculates an inter-face difference FrG as a first time variation and inter-field differences FiGu (t−1), FiGu (t), FiGd (t−1), and FiGd (t) as second time variations. The inter-frame difference FrG (t) is obtained by calculating the difference between each of pixel values of 15 taps of the (t−1)-th field and that of the (t+1)-th field in such a manner that the position of the former accords with the position of the latter, obtaining the absolute values of the obtained 15 inter-frame differences, and obtaining the average value. In other words, FrG (t) is obtained as follows.

$FrG(t) = [|a00-c00|+|a01-c01|+|a02-c02|/$ $+|a03-c03|+|a04-c04|+|a10-c10|$ $+|a11-c11|+|a12-c12|+|a13-c13|$ $+|a14-c14|+|a20-c20|+|a21-c21|$ $+|a22-c22|+|a23-c23|+|a24-c24|]/15$

Generally, it is determined that the motion of two adjacent frames is proportional to the inter-frame difference FrG (t).

Figure 3:
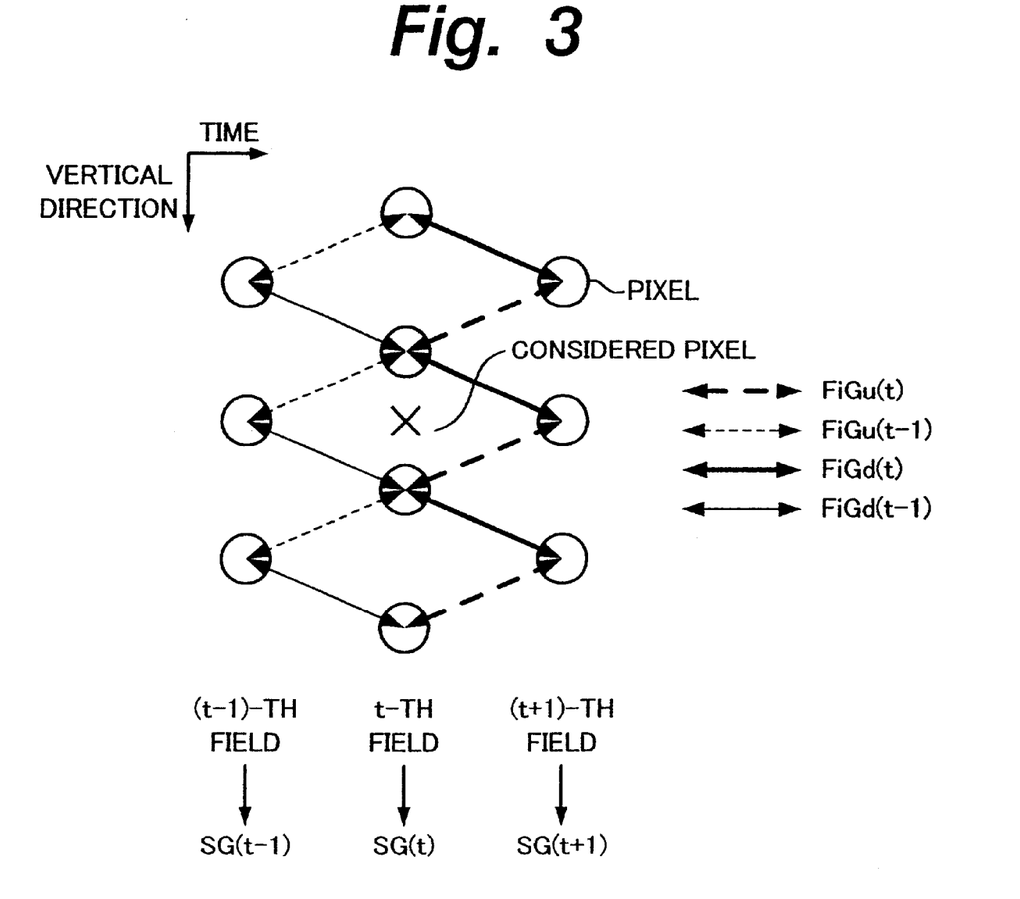
FIG. 3 is a schematic diagram for explaining a process of a time variation calculating portion.

FIG. 3 is a schematic diagram for explaining the inter-frame difference. In the interlace system, the vertical line positions of adjacent fields deviate. Thus, there are two types of inter-field differences: a difference between a line of the current field and a line of an adjacent field thereof in the case that the line of the current field is higher than the line of the adjacent field (the difference is denoted by a suffix u) and a difference between a line of the current field and a line of an adjacent field thereof in the case that the line of the current field is lower than the line of the adjacent field (the difference is denoted by a suffix d).

As is clear from FIG. 3, FiGu (t−1) represents an upward inter-field difference between the (t−1)-th field and the t-th field. FiGd (t−1) represents a downward inter-field difference between the (t−1)-th field and the t-th field. Likewise, FiGu (t) represents an upward inter-field difference between the t-th field and the (t+1)-th field. FiGd (t) represents a downward field difference between the t-th field and the (t+1)-th field. As with the frame difference FrG (t), the average value of the sums of the absolute values of the difference values of (5×3) pixels of one frame and (5×4) pixels of the adjacent frame is detected as the inter-field difference.

The detected inter-frame difference FrG (t) is supplied to the time variation to space variation calculating portion 5. The time variation to space variation calculating portion 5 is composed of a dividing device. The time variation to space variation calculating portion 5 obtains the ratio of the inter-frame difference FrG (t) of the t-th field received from the time variation calculating portion 4 to the space variation amount SG (t) of the taps of the t-th field received from the space variation amount calculating portion 3 (hereinafter, the ratio is referred to as time variation to space variation gfr (t) (=FrG (t)/SG (t))).

The time variation to space variation gfr (t) is supplied to a first condition determining portion 6, a second condition determining portion 7, and a third condition determining portion 8. The first condition determining portion 6 determines the motion of a picture corresponding to the variation of the space variation amount between adjacent fields. The second condition determining portion 7 determines the motion of a picture corresponding to the inter-field difference. The third condition determining portion 8 determines the motion of a picture in the same manner as gradient method. When each of the condition determining portions 6, 7, and 8 determines that the picture moves, it outputs data "1" (logical 1). When each of the condition determining portions 6, 7, and 8 determines that the picture stops, it outputs data "0" (logical 0). The output data of each of the condition determining portions 6, 7, and 8 is supplied to an OR gate 9. The OR gate 9 outputs the determined result of the motion of the picture. Thus, when one of the condition determining portions 6, 7, and 8 determines that the picture moves, it outputs data "1" as the determined result. Otherwise, it outputs data "0" as the determined result.

When the following three conditions are satisfied, the first condition determining portion 6 determines that the picture moves. Otherwise, the first condition determining portion 6 determines that the picture stops.

Condition C1: The space variation amount SG (t) of the current field (t-th field) should be equal to or larger than threshold value th1.

Condition C2: The variation between the space variation amount SG (t) of the current field and the space variation amount of the past field or the future field should be equal to or larger than threshold value th2.

Condition C3: The ratio of the inter-frame difference FrG and the space variation amount SG (t) of the current field should be equal to or larger than threshold value th3.

When all the three conditions are satisfied, the first condition determining portion 6 determines that the picture moves and outputs data "1" to the OR gate 9. Otherwise, the first condition determining portion 6 determines that the picture stops and outputs data "0" to the OR gate 9. These conditions can be expressed by the following formulas.

$$C1: SG(t) \geq th1$$

$$C2: min\ \{|SG(t)-SG(t-1)|, |SG(t)-SG(t+1)|\} \geq th2$$

$$C3: gfr(t) = FrG/SG(t) \geq th3$$

The second condition determining portion 7 uses the following conditions.

Condition C1: The space variation amount SG (t) of the current field (t-th field) should be equal to or larger than threshold value th1.

Condition C4: The maximum value of the inter-field differences of individual directions should be equal to or larger than threshold value th4.

Condition C5: The ratio of the inter-frame difference FrG to the space variation amount SG (t) of the current field should be equal to or larger than threshold value th5.

When all these conditions are satisfied, the second condition determining portion 7 determines that the picture moves and outputs data "1" to the OR gate 9. Otherwise, the second condition determining portion 7 determines that the picture stops and outputs data "0" to the OR gate 9. These conditions can be expressed by the following formulas.

$$C1: SG(t) \geq th1$$

$$C4: max\ \{FiGu(t-1), FiGu(t), FiGd(t-1), FiGd(t)\} \geq th4$$

$$C5: gfr(t) = FrG/SG(t) \geq th5$$

The third condition determining portion 8 uses the following condition.

Condition C6: The ratio of the inter-frame difference FrG to the space variation amount SG (t) should be equal to or larger than threshold value th6.

When the condition is satisfied, the third condition determining portion 8 determines that the picture moves and outputs data "1" to the OR gate 9. Otherwise, the third condition determining portion 8 determines that the picture stops and outputs data "0" to the OR gate 9. The condition C6 can be expressed by the following formula.

$$C6: gfr(t) = FrG/SG(t) \geq th6$$

where threshold value th6 is larger than threshold values th3 and th5.

Figure 4:
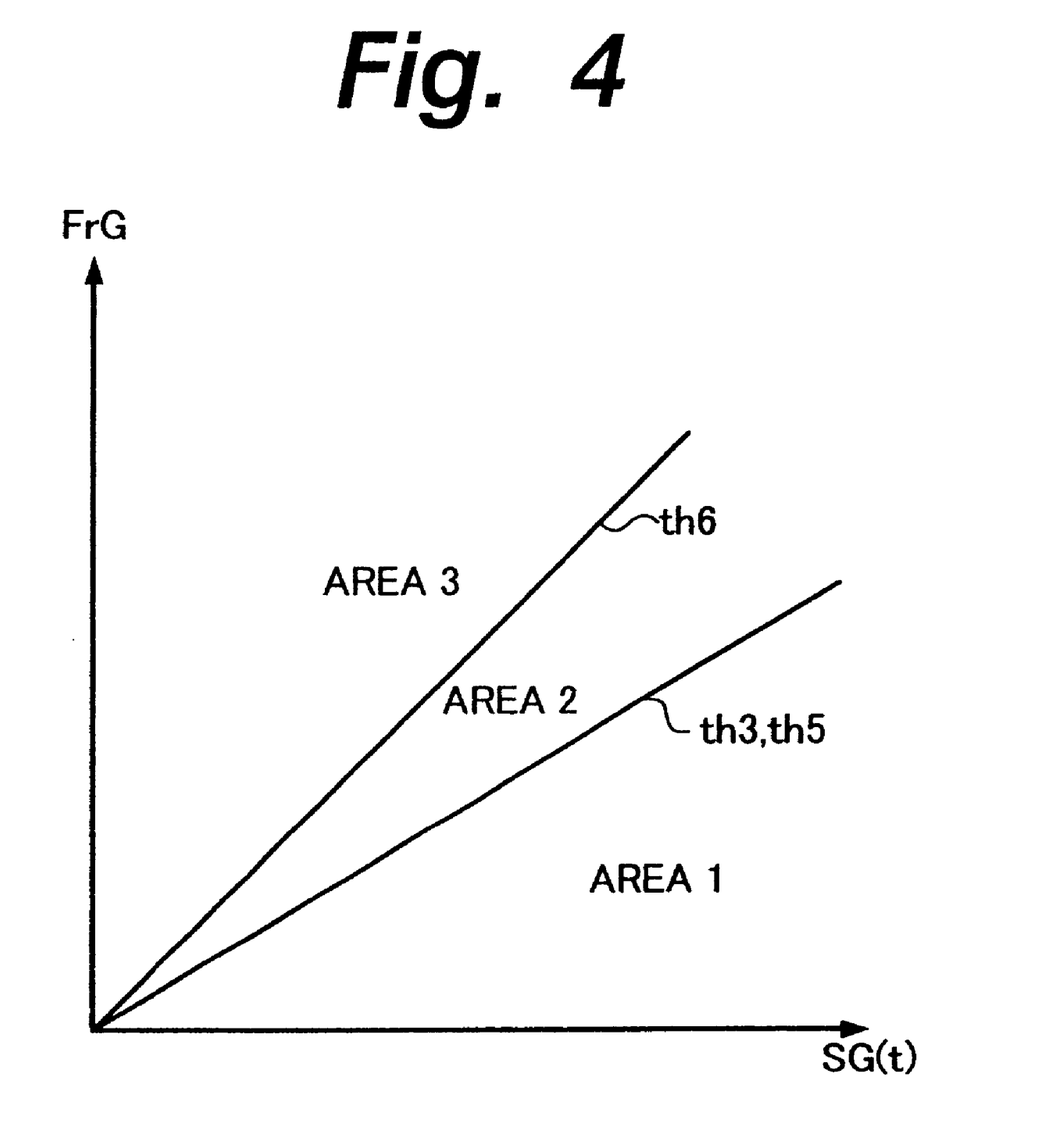
FIG. 4 is a schematic diagram for explaining a motion determining process according to the embodiment of the present invention.

In this case, the third condition is a value of which the inter-frame difference FrG is normalized with the space variation amount SG (t). The threshold values with respect to the ratio gfr (t) are th3, th5, and th6. As shown in FIG. 4, the threshold values are proportional to the space variation amount SG (t) and the inter-frame difference FrG. In FIG. 4, the horizontal axis and the vertical axis represent the space variation amount SG (t) and the inter-frame difference FrG, respectively. Threshold value th6 is larger than threshold values th3 and th5. Thus, there are an area 1 that is smaller than threshold values th3 and th5, an area 2 surrounded by threshold values th3, th5, and th6, and an area 3 that is equal to or larger than threshold value th6.

Only with the third condition that uses the ratio gfr (t) and the threshold value th6, it is determined that the picture stops in the areas 1 and 2.

In addition, it is determined that the picture in the area 3 that is equal to or larger than threshold value th6. However, according to the embodiment of the present invention, with threshold values th3 and th5, it is determined that the picture moves in the area 2. Only with threshold value th6, although the picture moves, it is determined that the pictures stops in the area 2. In such a manner, the accuracy of the motion determining process can be improved.

The OR gate 9 ORes the determined results of the first condition determining portion 6, the second condition determining portion 7, and the third condition determining portion 8. In other words, when it is determined that a considered pixel of a considered field (t-th field) moves, the OR gate 9 outputs data "1". In contrast, when it is determined that the considered pixel stops, the OR gate 9 outputs data "0".

Figure 5:
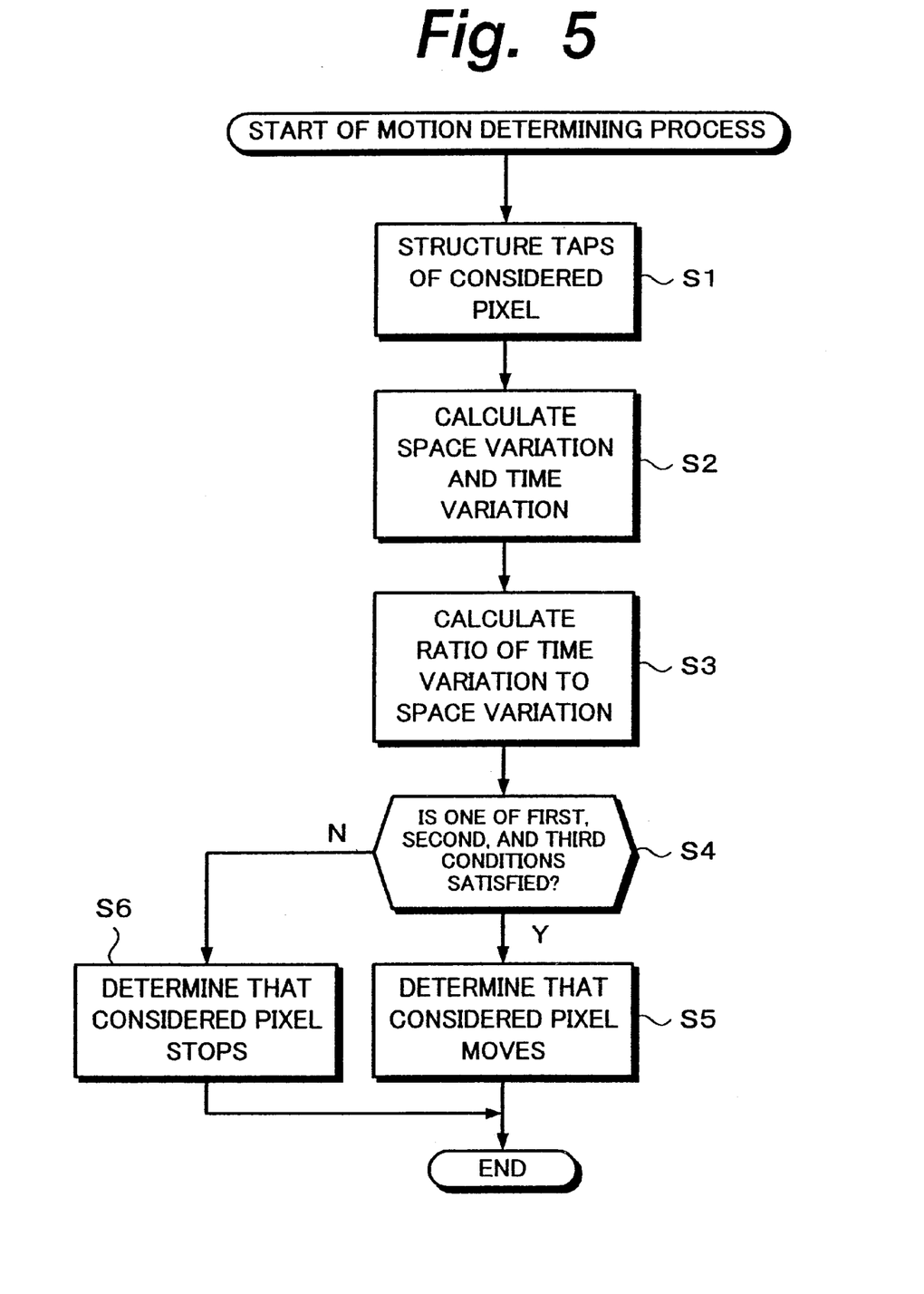
FIG. 5 is a flow chart for explaining a process of the motion determining apparatus shown in FIG. 1.

Next, with reference to a flow chart shown in FIG. 5, the motion determining process of the motion determining apparatus shown in FIG. 1 will be described. The motion determining process that follows can be accomplished by a software process of a computer rather than the motion determining apparatus shown in FIG. 1.

At step S1, taps of a considered pixel are structured. The tap structuring portion 2 extracts predetermined pixels in the vicinity of the considered pixel from the (t−1)th field, the t-th field, and the (t+1)-th field as shown in FIG. 2. The extracted taps are supplied to the space variation calculating portion 3 and the time variation calculating portion 4.

At step S2, the space variation calculating portion 3 calculates space variation amounts SG (t), SG (t−1), and SG (t+1). The obtained space variation amounts SG (t), SG (t−1), and SG (t+1) are supplied to the first condition determining portion 6. In addition, the space variation amount SG (t) is supplied to the time variation to space variation calculating portion 5. The time variation to space variation calculating portion 5 calculates the ratio of the inter-frame difference FrG to the space variation amount SG (t).

Moreover, at step S2, the time variation calculating portion 4 calculates the inter-frame difference FrG that is the first time variation amount. In addition, the time variation calculating portion 4 calculates the inter-field differences FiGu (t−1), FiGd (t−1), FiGu (t), and FiGd (t) that are the second time variation amounts.

At step S3, the time variation to space variation calculating portion 5 calculates the ratio gfr (t) of the time variation to the space variation (=FrG/SG (t)). The ratio gfr (t) is supplied to the first condition determining portion 6, the second condition determining portion 7, and the third condition determining portion 8.

At step S4, the first condition determining portion 6, the second condition determining portion 7, and the third condition determining portion 8 determine which of the conditions is satisfied. When one of the first to third conditions is satisfied, it is determined that the considered pixel moves. Thus, the OR gate 9 outputs data "1" (at step S5). On the other hand, when all the first to third conditions are not satisfied, it is determined that the considered pixel stops. Thus, the OR gate 9 outputs data "0" (at step S6). In such a manner, the motion determining process is completed.

Instead of the sum of absolute values, the sum of squares may be obtained.

In the embodiment of the present invention, a considered field and adjacent fields thereof are used. Alternatively, the considered field and adjacent fields that are apart therefrom by two fields may be used.

According to the embodiment of the present invention, as shown in FIG. 2, a picture contained in a rectangular block is extracted as taps. Alternatively, pixels contained in a circular block or a cross shaped block may be extracted as taps.

According to the present invention, when one of the first condition determination corresponding to the inter-field space variation amount, the second condition determination corresponding to the inter-field difference, and the third condition determination corresponding to the ratio of the inter-frame difference to the space variation amount is satisfied, it is determined that a considered pixel moves. Thus, the motion of the considered pixel can be accurately determined. Consequently, corresponding to the determined result of the motion determining process, a picture that moves, a picture that stops, and a picture that slightly moves can be properly processed.

What is claimed is:

1. A motion determining apparatus for determining a motion of an object contained in an input picture signal, comprising:

space variation detecting means for detecting a space variation of the input picture signal;

time variation detecting means for detecting a time variation of the input picture signal;

ratio detecting means for detecting the ratio of the space variation to the time variation; and motion determining means for determining the motion of the object contained in the input picture signal according to the space variation, the time variation, and the ratio.

2. The motion determining apparatus as set forth in claim 1, wherein each of said space variation detecting means, said time variation detecting means, said ratio detecting means, and said motion determining means performs a detecting process for each partial picture of the input picture signal.

3. The motion determining apparatus as set forth in claim 1, further comprising:

space variation inter-field difference detecting means for detecting a space variation inter-field difference that represents a difference between the space variation of the input picture signal of a considered field and the space variation of the input picture signal of at least each of the fields that precedes and follows the considered field, wherein said motion determining means determines the motion of the object contained in the input picture according to the ratio and the space variation inter-field difference.

4. The motion determining apparatus as set forth in claim 3, wherein said motion determining means determines that the input picture moves according to a first condition of which the space variation inter-field difference is equal to or larger than a first threshold value (th2) and the ratio is equal to or larger than a second threshold value (th3).

5. The motion determining apparatus as set forth in claim 4, wherein said motion determining means determines that the input picture moves according to a second condition of which the ratio is equal to or larger than a third threshold value (th6) that is larger than the second threshold value regardless of the first condition.

6. The motion determining apparatus as set forth in claim 1, further comprising:

a second time variation detecting portion for detecting a time variation according to the input picture signals of a plurality of fields whose time intervals are shorter than the time intervals at which said time variation detecting means detects the time variations, wherein said motion determining means determines the motion of an object contained in the input picture according to the ratio and the detected result of said second time variation detecting portion.

7. The motion determining apparatus as set forth in claim 6, wherein said motion determining means determines that the input picture moves according to a first condition of which the detected result of said second time variation detecting portion is equal to or larger than a first threshold value (th4) and the ratio is equal to or larger than a second threshold value (th5).

8. The motion determining apparatus as set forth in claim 7, wherein said motion determining means determines that the input picture moves according to a second condition of which the ratio is equal to or larger than a third threshold value (th6) that is larger than the second threshold value regardless of the first condition.

9. The motion determining apparatus as set forth in claim 1,
- wherein said space variation detecting means detects a space variation of the input picture signal of the considered field according to the input picture signal of a considered field and input picture signals of at least the fields that precede and follow the considered field.

10. The motion determining apparatus as set forth in claim 9,
- wherein the input picture signal is an interlace signal.

11. A motion determining method for determining the motion of an object contained in an input picture signal, comprising the steps of:
- detecting a space variation of the input picture signal;
- detecting a time variation of the input picture signal;
- detecting the ratio of the space variation to the time variation; and
- determining the motion of the object contained in the input picture signal according to the space variation, the time variation, and the ratio.

12. The motion determining method as set forth in claim 11,
- wherein at each of the space variation detecting process, the time variation detecting process, the ratio detecting process and the motion process is performed for each partial picture of the input picture signal.

13. The motion determining method as set forth in claim 11, further comprising the step of:
- detecting a space variation inter-field difference that represents a difference between a space variation of the input picture signal of a considered field and a space variation of the input picture signal of at least each of the fields that precedes and follows the considered field,
- wherein the motion of the object contained in the input picture is determined according to the ratio and the space variation inter-field difference.

14. The motion determining method as set forth in claim 13,
- wherein it is determined that the input picture moves according to a first condition of which the space variation inter-field difference is equal to or larger than a first threshold value (th2) and the ratio is equal to or larger than a second threshold value (th3).

15. The motion determining method as set forth in claim 14,
- wherein it is determined that the input picture moves according to a second condition of which the ratio is equal to or larger than a third threshold value (th6) that is larger than the second threshold value regardless of the first condition.

16. The motion determining method as set forth in claim 11, further comprising the step of:
- detecting a time variation according to the input picture signal of a plurality of fields whose time intervals are shorter than the time intervals at which the time variations are detected,
- wherein it is determined that the motion of an object contained in the input picture according to the ratio and the detected result of the second time variation detecting portion.

17. The motion determining method as set forth in claim 16,
- wherein it is determined that the input picture moves according to a first condition of which the detected result of the second time variation detecting portion is equal to or larger than a first threshold value (th4) and the ratio is equal to or larger than a second threshold value (th5).

18. The motion determining method as set forth in claim 17,
- wherein it is determined that the input picture moves according to a second condition of which the ratio is equal to or larger than a third threshold value (th6) that is larger than the second threshold value regardless of the first condition.

19. The motion determining method as set forth in claim 11,
- wherein it is detected that the space variation of the input picture signal of the considered field according to the input picture signal of a considered field and the input picture signal of at least the fields that precede and follow the considered field.

20. The motion determining method as set forth in claim 19,
- wherein the input picture signal is an interlace signal.

\* \* \* \* \*